United States Patent
Gruender et al.

(10) Patent No.: US 11,938,934 B2
(45) Date of Patent: Mar. 26, 2024

(54) CRUISE CONTROL SYSTEM FOR MOTOR VEHICLES

(71) Applicant: Robert Bosch GmbH, Stuttgart (DE)

(72) Inventors: Axel Gruender, Oehringen (DE); Simon Holeczek, Sersheim (DE); Marco Desiderio, Weinsberg (DE)

(73) Assignee: ROBERT BOSCH GMBH, Stuttgart (DE)

(*) Notice: Subject to any disclaimer, the term of this patent is extended or adjusted under 35 U.S.C. 154(b) by 116 days.

(21) Appl. No.: 17/651,947

(22) Filed: Feb. 22, 2022

(65) Prior Publication Data
US 2022/0281450 A1    Sep. 8, 2022

(30) Foreign Application Priority Data
Mar. 5, 2021    (DE) ...................... 10 2021 202 144.1

(51) Int. Cl.
*B60W 30/14* (2006.01)
*B60W 40/072* (2012.01)
(Continued)

(52) U.S. Cl.
CPC ........ *B60W 30/143* (2013.01); *B60W 40/072* (2013.01); *B60W 40/105* (2013.01);
(Continued)

(58) Field of Classification Search
CPC ............ B60W 30/143; B60W 40/072; B60W 40/105; B60W 40/109; B60W 50/00;
(Continued)

(56) References Cited

U.S. PATENT DOCUMENTS

| 9,862,380 B2 * | 1/2018 | Minoiu Enache .... B60W 30/09 |
| 2008/0059036 A1 * | 3/2008 | Imai ..................... B60W 30/143 |
| | | 701/93 |

(Continued)

FOREIGN PATENT DOCUMENTS

| DE | 102018002335 A1 * | 9/2019 | ............ B60W 30/02 |
| DE | 102018002335 A1 | 9/2019 | |

OTHER PUBLICATIONS

DE-102018002335-A1 Translation (Year: 2019).*

*Primary Examiner* — Jeff A Burke
*Assistant Examiner* — Kyle T Johnson
(74) *Attorney, Agent, or Firm* — NORTON ROSE FULBRIGHT US LLP; Gerard A. Messina

(57) ABSTRACT

A cruise control system for a motor vehicle. The system includes a setpoint value generator for generating a setpoint value determining the vehicle speed, and an actuating device that controls the speed of the vehicle to a setpoint speed through intervention into the drive and/or braking system. The system automatically adapts the setpoint speed to a predicted roadway curvature. The setpoint value generator includes at least two modules working independently from one another, including a base module for generating a base setpoint value and a curve module for generating a curve setpoint value that represents a maximum speed at which a curve having a given curvature may be negotiated without exceeding a predefined limiting value for the lateral acceleration of the vehicle, and includes a fusion module that forms a final setpoint value for the actuating device from the base setpoint value and the curve setpoint value through minimum selection.

12 Claims, 3 Drawing Sheets

(51) Int. Cl.
*B60W 40/105* (2012.01)
*B60W 40/109* (2012.01)
*B60W 50/00* (2006.01)

(52) U.S. Cl.
CPC .......... *B60W 40/109* (2013.01); *B60W 50/00* (2013.01); *B60W 2050/0083* (2013.01); *B60W 2420/42* (2013.01); *B60W 2420/52* (2013.01); *B60W 2520/125* (2013.01); *B60W 2552/30* (2020.02); *B60W 2556/35* (2020.02)

(58) Field of Classification Search
CPC ..... B60W 2050/0083; B60W 2420/42; B60W 2420/52; B60W 2520/125; B60W 2552/30; B60W 2556/35; B60W 2720/10; B60W 2520/10; B60W 2556/50; G01C 21/3804; G01S 13/931; G01S 2013/9321; G06F 9/06

See application file for complete search history.

(56) References Cited

U.S. PATENT DOCUMENTS

| | | | |
|---|---|---|---|
| 2008/0059037 A1* | 3/2008 | Isaji ................... | B60W 40/072 701/93 |
| 2010/0100281 A1* | 4/2010 | Huang ............... | B60W 30/143 701/41 |
| 2010/0191436 A1* | 7/2010 | Hellmann .......... | B60W 30/146 701/96 |
| 2012/0209489 A1* | 8/2012 | Saito ................ | B60W 50/0097 701/70 |
| 2013/0138319 A1* | 5/2013 | Schuberth .......... | B60K 31/0066 701/93 |
| 2014/0371974 A1* | 12/2014 | Huelsebusch ......... | G05D 13/00 701/1 |
| 2016/0203716 A1* | 7/2016 | Jeschke .............. | B60W 40/072 701/532 |
| 2017/0010120 A1* | 1/2017 | Shashua ............. | G01C 21/3691 |
| 2017/0072955 A1* | 3/2017 | Ediger ................. | B60W 30/16 |
| 2018/0024562 A1* | 1/2018 | Bellaiche ................ | G06T 7/74 701/26 |
| 2018/0037232 A1* | 2/2018 | Fu .................. | B60W 30/18145 |
| 2022/0009487 A1* | 1/2022 | Belle .................. | B60W 30/146 |

* cited by examiner

CRUISE CONTROL SYSTEM FOR MOTOR VEHICLES

CROSS REFERENCE

The present application claims the benefit under 35 U.S.C. § 119 of German Patent Application No. 10 2021 202 144.1 filed on Mar. 5, 2021, which is expressly incorporated herein by reference in its entirety.

FIELD

The present invention relates to a cruise control system for motor vehicles, including a setpoint value generator for generating a setpoint value determining the vehicle speed and an actuating device that is designed to control the speed of the vehicle to a setpoint speed through intervention into the drive and/or braking system, the cruise control system being configured to automatically adapt the setpoint speed to a predicted roadway curvature.

BACKGROUND INFORMATION

A cruise control system of this type including a surroundings sensor system that makes it possible to detect preceding vehicles and to measure their distances and relative velocities and that also makes it possible to determine the anticipated course of the roadway ahead of the host vehicle is described in German Patent Application No. DE 10 2018 002 335 A1. On the basis of these data and on the basis of the actual speed of the host vehicle, a setpoint value for the vehicle acceleration is then set in such a way that the vehicle speed is controlled to a desired speed selected by the driver if no preceding vehicle is present; or, if a slower preceding vehicle is present in one's own driving lane, the distance from this vehicle is controlled to a predefined time interval. Based on the predicted roadway course, it may also be decided whether the preceding vehicle is located in one's own lane or in an adjacent lane, and it is decided as a function thereof whether or not a cruise control is to be carried out with regard to this vehicle. Moreover, the surroundings sensor system makes it possible to ascertain information with regard to a course of the curve of a driving lane located in the area ahead of the host vehicle, in which the host vehicle is located, and to delimit the maximum vehicle acceleration of the host vehicle in accordance with the ascertained information. In the case of a curved roadway course, the acceleration is delimited to a value that is smaller than the acceleration in the case of a corresponding cruise control on a straight road.

The setpoint value generated by the setpoint value generator is in this case an acceleration setpoint value. This acceleration setpoint value may be computed from a setpoint value for the speed in that the difference between the speed setpoint value and the actual speed is divided by a suitably selected time constant that determines how quickly the setpoint/actual deviation of the speed is corrected.

Equivalently thereto would be a system, in which the setpoint value generator generates a speed setpoint value and the actuating device connected downstream is designed to control the speed of the vehicle to this setpoint value.

In a cruise control system that has a distance control function, it may occur that the preceding vehicle, which is tracked as the target object, becomes temporarily lost from the locating range of the surroundings sensor system (for example of a radar sensor) while negotiating a curve. If the desired speed selected by the driver is greater than the previous speed of the two vehicles, the control system would prompt an acceleration to the desired speed. When negotiating curves, however, this response of the system would be generally undesirable, since the lateral acceleration of the vehicle in the curve could become inadmissibly high.

Conventional cruise control systems, to solve this problem, include a specific curve speed controller (CSC) that assumes cruise control in this situation and controls the speed to a setpoint value that is lower than the desired speed and is adapted to the instantaneous roadway curvature in such a way that the lateral acceleration of the vehicle remains within reasonable limits. This function may also be implemented predictively in the sense that based on the chronological change in the curvature of the roadway section that is instantaneously being traveled by the host vehicle the course of the curvature is extrapolated into the future to some extent. In the case of this CSC function, the determination of the roadway curvature is based solely on the dynamic data of the host vehicle, however, and not on the information of a surroundings sensor system. It would therefore be desirable to expand the functionality in such a way that the information of the surroundings sensor system may also be used to determine the roadway curvature and thus make possible a more anticipatory adaptation of the speed to the anticipated roadway course.

SUMMARY

It is an object of the present invention to provide a cruise control system that allows for such an anticipatory cruise control adaptation, but may easily be integrated into existing cruise control systems.

This object may be achieved according to an example embodiment of the present invention in that the setpoint value generator includes at least two modules working independently from one another, namely a base module for generating a base setpoint value and a curve module for generating a curve setpoint value that represents a maximum speed, at which a curve having a given curvature may be negotiated without exceeding a predefined limiting value for the lateral acceleration of the vehicle, and in that the setpoint value generator further includes a fusion module that is configured to form a final setpoint value for the actuating device from the base setpoint value and the curve setpoint value through minimum selection.

As a result of the modular design of the cruise control system according to the present invention it is achieved that the components of conventional cruise control systems may be taken over practically unchanged to form the base module for the new system. The expansion of the functionality by a predictive cruise control adaptation in curves is simply achieved in that the curve module is added as an additional module. The only adaptation that is moreover necessary at the conventional system is that the fusion model must have an additional input for the entry of the curve setpoint value.

Since the components of a cruise control system for motor vehicles are safety-relevant systems, a meticulous validation in complex testing procedures is necessary prior to market introduction. One advantage of the present invention is thus the fact that this validation may be essentially limited to the newly added component, the curve module, since the base module remains unchanged and the validations that were already carried out in the past as well as the many collected practical experiences that were often faced over many years continue to remain valid.

Advantageous embodiments and refinements of the present invention are disclosed herein.

If the cruise control system has a CSC function, the determination of the roadway curvature takes place in the system as a whole in two independent ways, namely on the one hand within the CSC function on the basis of the dynamic data of the host vehicle, and on the other hand by evaluating the data of the surroundings sensor system in the curve module or, optionally, in a special module that provides the curvature data for the curve module. The results of the curvature determination within the scope of the predictive cruise control adaptation will generally refer to a roadway section that is at a greater distance ahead of the host vehicle than the roadway section to which the curvature determination on the basis of the dynamic data refers. This results in the advantageous possibility of checking the results of the predictive curvature determination based on the dynamic data at a later point in time, when the vehicle has actually reached the pertinent roadway section. In this way, a malfunction of one of these two systems may be detected more easily and potentially corrected.

The surroundings sensor system may be a radar system or also a video system, or optionally a combination of the two systems. In the latter case, a higher accuracy and reliability is achieved as a result of the redundancy in the surroundings detection. For curvature determination, in addition to the data of a digital map, data may also optionally be used that may be retrieved from a navigation system, for example.

In one specific embodiment of the present invention, the maximum speed that is not to be exceeded when negotiating the curve may be computed in the predictive curve module based on the roadway curvature and a predefined value for an admissible maximum lateral acceleration of the vehicle. This predefined value itself may vary depending on the situation, for example as a function of the driving speed of the host vehicle or potentially also as a function of the road condition (for example snow or black ice) that is input manually or established automatically.

In one specific embodiment of the present invention, the distance between the host vehicle and the roadway section, for which the curvature determination is carried out, may also be varied manually or according to a specific algorithm, so that it is possible, for example, to select a smaller distance on a mountain pass than when traveling on a highway. Finally, it is also possible to determine the roadway curvature for several roadway sections that are located at different distances ahead of the host vehicle. In this case, the curve module provides several different curve setpoint values, one for each curvature determination, at any given point in time. These several curve setpoint values may, however, also be fused with one another in the fusion module through minimum selection like all the other setpoint values.

It is likewise possible to apply a holding function to the curve setpoint value, which does not allow an increase in the curve setpoint value until the roadway section, which the curvature determination referred to, has actually been passed. It may thus be prevented that the vehicle accelerates again even before reaching the curve, since the curve determination already focuses on a roadway section located after the curve.

One exemplary embodiment is elucidated in greater detail in the following with reference to the figures.

DETAILED DESCRIPTION OF EXAMPLE EMBODIMENTS

Figure 1:
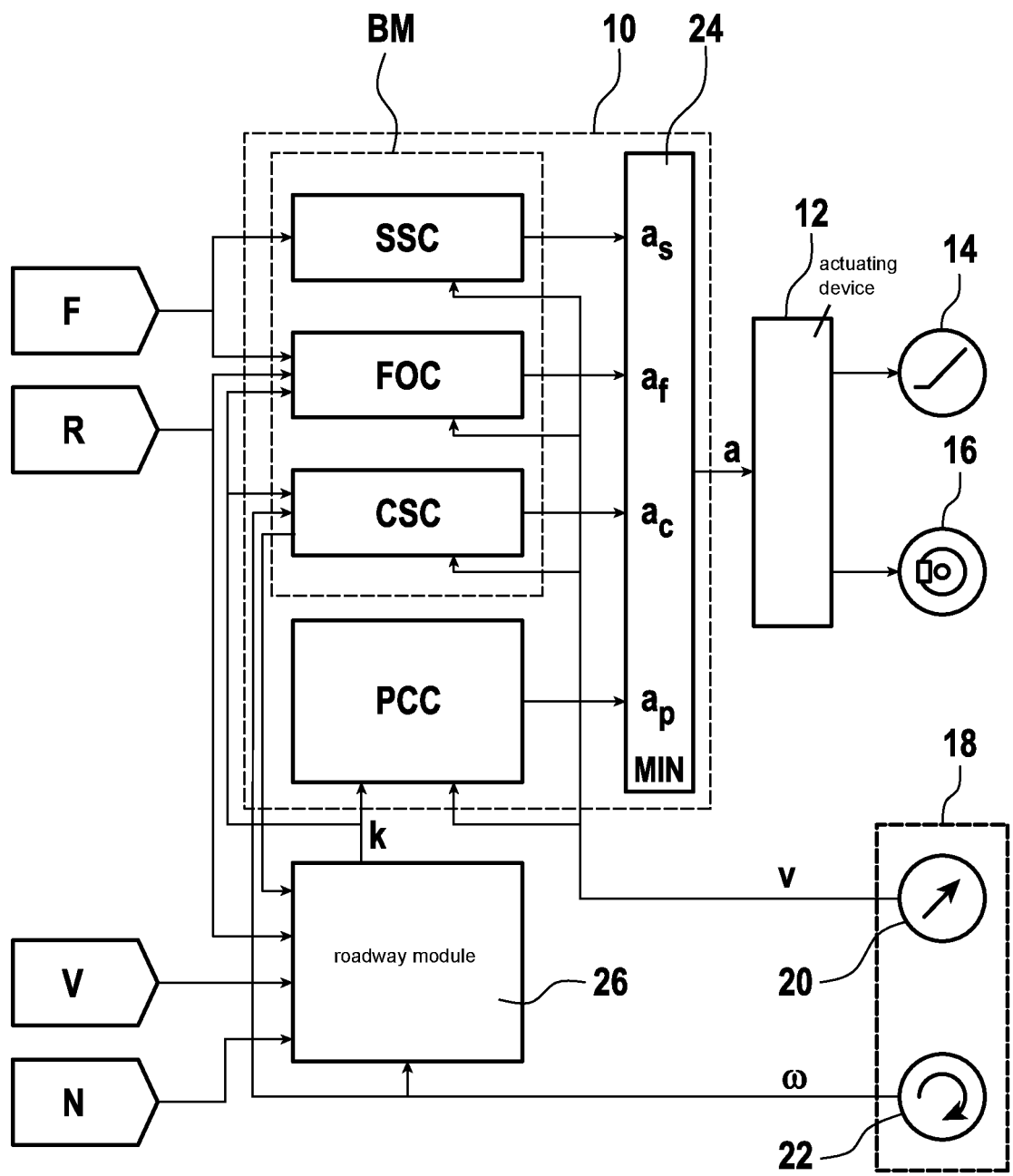
FIG. 1 shows a block diagram of a cruise control system according to an example embodiment of the present invention.

In FIG. 1, a cruise control system for a motor vehicle is illustrated as a block diagram. The system includes a setpoint value generator 10 that continuously provides updated acceleration setpoint values a to a actuating device 12. Actuating device 12 implements these setpoint values into control commands for a drive system 14 and a braking system 16 of the vehicle.

A sensor system 18 of the host vehicle includes a speedometer 20 for measuring actual speed v of the vehicle and a yaw motion sensor 22 for measuring the data that refer to the yaw motion of the vehicle, for example yaw speed $\omega$, the yaw angle acceleration, the lateral acceleration and/or the steering angle.

In the example shown, setpoint value generator 10 has four setpoint value modules, namely a desired speed module SSC (set speed controller), a distance module FOC (forward object controller), a curve speed controller CSC and a predictive curve module PCC (predictive curve controller). First three modules SSC, FOC, and CSC are also referred to in summary as base module BM.

Desired speed module SSC stores a desired speed input by the driver via a driver interface F and continuously compares same to actual speed v reported by speedometer 20. The difference between these two speeds is divided by a time constant and the result forms an acceleration setpoint value $a_s$ that is transferred to a fusion module 24.

Distance module FOC fulfils the function of a conventional radar-based distance controller. If a radar sensor R that belongs to the surroundings sensor system of the vehicle locates a preceding vehicle in the driving lane traveled by the host vehicle, it reports the distance and relative speed data of the preceding vehicle to the distance module. Moreover, a setpoint time gap that determines the time distance, at which the host vehicle is to follow the preceding vehicle (the target object), may be set in the distance module via driver interface F. In the distance module, a speed profile that results in that the speed of the host vehicle is adapted to that of the preceding vehicle and the time gap between the two vehicles is controlled to the setpoint time gap, is then computed according to known algorithms. The setpoint speed determined by this speed profile is compared to actual speed v and an acceleration setpoint value of is computed through division of the difference by a time constant (that does not need to be congruent with the time constant in the desired speed module) and transferred to fusion module 24.

Radar sensor R also provides locating angle data on the target object. Moreover, distance module FOC receives information on the anticipated course of the roadway from a roadway module 26. Based on these data, the distance module is able to decide whether the located preceding vehicle is still in the lane traveled by the host vehicle or in an adjacent lane. If the preceding vehicle has left one's own lane, the distance control is terminated in that the setpoint speed computed in the distance module is set to a very high value that is unreachable in practice. Since fusion module 24 selects the minimum from the setpoint values that it receives from the different setpoint value modules in each case, setpoint value of no longer serves a function as a result.

Curve speed module CSC receives from speedometer 20 actual speed v of the vehicle and from yaw motion sensor 22 the data (yaw speed and/or lateral acceleration) that make possible a computation of the curvature of the roadway section that is instantaneously traveled by the host vehicle. In the example shown, these data include yaw speed $\omega$. This yaw speed $\omega$ is at the same time the angular speed of the host vehicle in the case of an orbital motion on a circle having radius (curvature radius) r. Consequently, for actual speed v of the vehicle the following applies: $v=\omega r$. Curvature radius r is consequently quotient $v/\omega$ and the reciprocal value of this curvature radius is the instantaneous roadway curvature at the location of the vehicle.

This curvature may be reported back to roadway module 26 for control purposes.

Actual speed v of the vehicle multiplied by yaw speed $\omega$ is the lateral acceleration of the vehicle. To maintain driving stability, this lateral acceleration should not exceed a specific limiting value, for example 3 m/s². If, however, a specific lateral acceleration q is predefined, a speed, at which the vehicle would have exactly the predefined lateral acceleration, may be computed from relation $q=\omega v=v^2/r$. If instantaneous actual speed v is above this value, an acceleration setpoint value $a_c$, which results in the vehicle speed being reduced to the maximum value admissible in the case of this roadway curvature, may be formed from the difference, again through division by a time constant.

In addition to radar sensor R, a video system V, with the aid of which images of the roadway lying ahead of the vehicle are recorded, in particular continuously, is also part of the surroundings sensor system of the vehicle. With the aid of known image processing algorithms, the roadway boundaries (for example markings) may be identified and, following the compensation for the perspective distortion curvature k of the roadway, may be determined from the curved course of these roadway boundaries on the entire section that the video system is able to see. Roadway module 26 may thus compute a curvature value k for each point on this roadway section.

The curvature values for the section lying directly ahead of the host vehicle may be reported to curve speed module CSC and used there for a proactive adaptation of the speed. Curvature value k for a point (referred to as a "focal point" in the following) lying somewhat further ahead of the host vehicle is reported to predictive curve module PCC and used there in the same manner as in curve speed module CSC for the purpose of computing a speed that the vehicle should not exceed when it reaches this point on the roadway, so that the predefined value is maintained for the lateral acceleration. Through comparison of this speed to actual speed v and through division by a time constant, a further acceleration setpoint value $a_p$ is computed and transferred to fusion module 24.

Overall, fusion module 24 thus receives four acceleration setpoint values $a_s$, $a_f$, $a_c$ and $a_p$, and fusion module 24 selects at any given point in time the smallest of these setpoint values and provides it as final acceleration setpoint value a to actuating device 12.

During undisturbed driving on a straight roadway, i.e., when no preceding vehicle is located, setpoint value a is equal to setpoint value $a_s$, which corresponds to the desired speed selected by the driver. When a preceding vehicle is located that is slower than this desired speed, the roadway is still straight, however, setpoint value a is formed by setpoint value of provided by the distance module.

When the vehicle approaches a curve, curvature k, which roadway module 26 provides to predictive curve module PCC and which refers to a focal point that is relatively far ahead of the host vehicle, will initially increase. When the lateral acceleration, which results from this curvature and instantaneous actual speed v of the vehicle, is too high, the module outputs a very small acceleration setpoint value $a_p$ and it is this value that determines final setpoint value a.

When the vehicle further approaches the curve, the curvature that is reported to predictive curve module PCC will slowly decrease again, since the focal point is moved further ahead. At the same time, the curvature reported to curve speed module CSC will increase, since the host vehicle is now entering the curve. In this case, final acceleration setpoint value a is equal to setpoint value $a_c$ provided by curve speed module CSC.

In the example shown, roadway module 26 also receives information on the roadway from two further sources of information, namely from radar sensor R and from a navigation system N or the digital map of the road network stored therein. The information provided by radar sensor R may be distance and angle data from guardrail posts and the like, for example, which also make possible a determination of the roadway course. By comparing the data of the radar sensor to the data of the video system, the error susceptibility may thus be reduced and the accuracy improved. The same is true for the comparison of the data to the data from navigation system N. Optionally or in addition, the surroundings sensor system may also include a LIDAR sensor.

The operating mode of the system is to be elucidated with reference to FIGS. 2 through 5 based on one exemplary situation.

Figure 2:
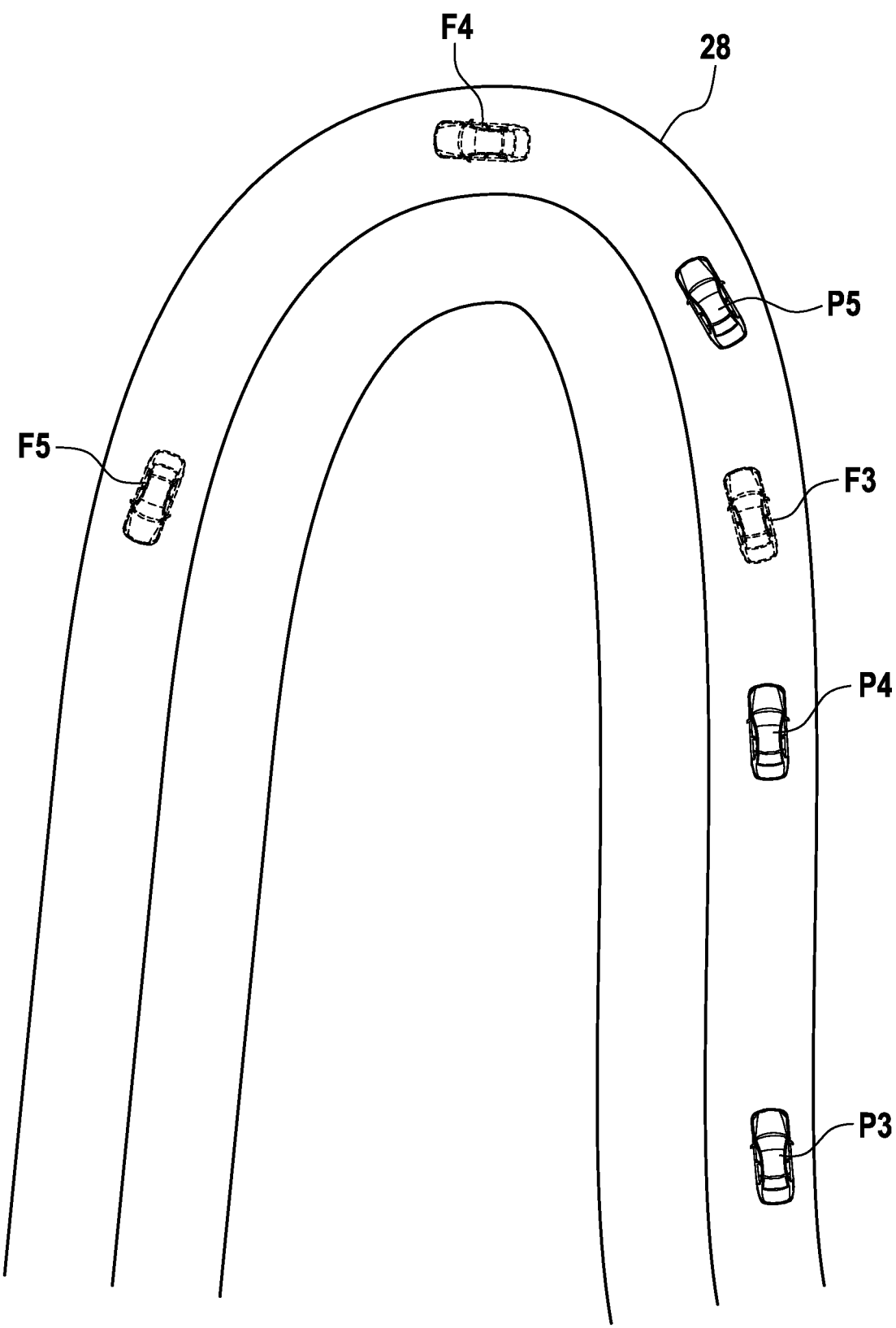
FIG. 2 shows a draft of three consecutive phases when negotiating a hairpin turn.

In FIG. 2, a roadway 28 is schematically shown that runs in the shape of a hairpin turn. P3 identifies the position on this roadway 28 of a vehicle, which is equipped with the above-described cruise control system. F3 identifies the focal point on the roadway, for which roadway module 26 computes the predicted roadway curvature, when the vehicle is in position P3. In this situation, roadway module 26 only reports a relatively small curvature k, so that proactive curvature module PCC is not yet active.

In order to compensate for statistical variations, curvature k is computed for focal point F3 in that a varying mean value of a sequence of local curvatures, which are computed and recorded, is formed over a certain time period of several milliseconds, for example, while the focal point is moving along the roadway.

At a slightly later point in time, the vehicle has reached a position P4 and the associated focus of the curvature prediction is at F4, at the most narrow point of the curve. At an even later point in time, the vehicle has reached a position P5 and is about to enter the most narrow part of the curve. The associated focus of the curvature position is then at F5, already behind the curve, so that a smaller curvature is measured once again. Without additional measures, this would result in the control being transferred from predictive curve module PCC to curve speed module CSC. This module could then allow under certain circumstances a speed that is too high, since the instantaneous lateral acceleration at location P5 is still relatively small.

Figure 3:
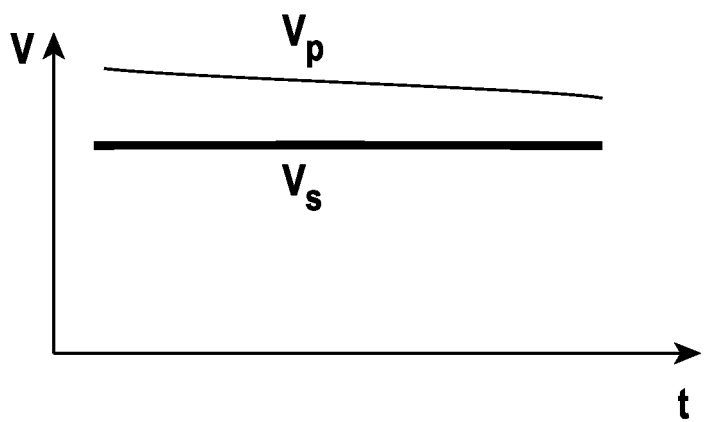
FIGS. 3 through 5 show setpoint value curves for the three phases illustrated in FIG. 2.
Figure 4:
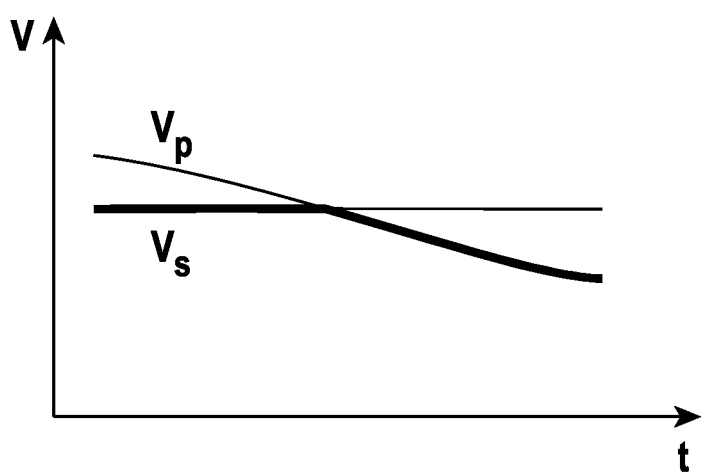
Figure 5:
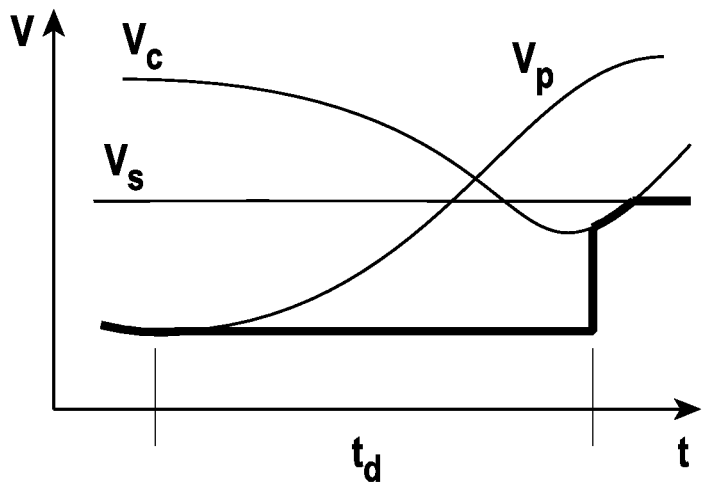

In FIGS. 3 through 5, the relevant setpoint speeds are illustrated in a time diagram for positions P3, P4, and P5 shown in FIG. 2 in each case. It is not the setpoint accelerations according to FIG. 1 that are represented here, but the associated setpoint speeds, since these setpoint speeds are independent from the particular actual speed of the vehicle and the diagrams may thus be better compared to one another.

In FIG. 3, the situation around the point in time at which the vehicle drives through position P3 is illustrated. Setpoint speed $V_p$, which is computed by predictive curvature module PCC and which determines setpoint acceleration $a_p$, is relatively high due to the minor roadway curvature and greater than setpoint speed $V_s$ that corresponds to the desired speed selected by the driver. For this reason, the setpoint acceleration is determined by desired speed $V_s$ in this case.

In FIG. 4, setpoint speed $V_p$ significantly decreases, since the focus of the curvature measurement (at F4) enters the narrow part of the curve and the roadway curvature thus increases. Setpoint speed $V_p$ decreases below desired speed $V_s$ and then predictive curvature module PCC assumes control.

In FIG. 5, setpoint speed $V_p$ increases again, since the focus of the curvature determination has again left the curve behind. Curve speed module CSC computes a setpoint speed $V_c$ that decreases with increasing roadway curvature, but is initially still greater than $V_p$, so that the predictive curvature module maintains control. If a pure minimum selection took place in fusion module 24, final setpoint speed a would increase correspondingly to the curve for setpoint speed $V_p$ until desired speed $V_s$ is reached again. Only then would the vehicle enter the curve and decreasing setpoint speed $V_c$ would force a deceleration of the vehicle once again. This would result in a very choppy way of driving, during which the vehicle is initially accelerated and decelerated again immediately after that.

To prevent this from happening, a holding function is implemented in fusion module 24 that ensures that setpoint speed $V_p$ cannot increase again, after reaching a minimum, until a certain delay time td has elapsed. This delay time approximately corresponds to the time required by the vehicle to travel the road from its instantaneous position to the position of focus of the curvature determination. In the example shown, delay time td has not elapsed until setpoint speed $V_c$ has already decreased to the extent that it prevents an undesired increase in speed. The fact that the final setpoint speed changes abruptly in FIG. 5 does not have a significant effect on the driving behavior, since the corresponding change in acceleration setpoint value a takes effect only slowly due to the time constant.

What is claimed is:

1. A cruise control system for a motor vehicle, comprising:
   a processor, wherein the processor is configured to generate an output setpoint value for a speed of the vehicle; and
   an actuating device;
   wherein:
      the processor is configured to control the actuating device to perform an intervention into a drive and/or braking system of the vehicle by which to bring the speed of the vehicle to the output setpoint value generated by the processor;
      the generation of the output setpoint value for the speed is performed by:
         determining a plurality of setpoint values for the output setpoint value, the plurality of setpoint values including at least:
            a first setpoint value for the output setpoint value based on a first roadway curvature currently negotiated by the vehicle at a current position of the vehicle; and
            a second setpoint value for the output setpoint value based on a second roadway curvature that the vehicle is predicted to negotiate at a later point in time at a focal point that is at a distance from the current position; and
         selecting, as the output setpoint value, a minimum of the plurality of setpoint values; and
      the cruise control system includes at least two modules including a base module configured to generate a base one of the following features (a)-(b):
         (a) the second roadway curvature is determined by obtaining a mean value of a plurality of local curvatures computed over a time period during which the focal point moves along a road; and
         (b) the selecting is performed continuously over time, so that the output setpoint value changes over time, from moment to moment by discrete ones of a plurality of instances of the minimum selection performed, respectively, at each of the moments, to be set to whichever of the plurality of setpoint values is the minimum at the respective current one of the moments based on respective second roadway curvatures depending on application of the focal point at the respective current one of the moments, and the processor is configured so that, after the second setpoint value drops over time to a minimum value determined at a particular point in time, the second setpoint value through used as one of the plurality of setpoint values from which the minimum is selected cannot increase again after the particular point in time until passage of a predefined time period from the particular point in time even when the second roadway curvature that the vehicle is predicted to negotiate, based on which the second setpoint value is determined, decreases.

2. The system as recited in claim 1, wherein the processor is configured to compute the second roadway curvature based on data of a surroundings sensor system.

3. The system as recited in claim 2, further comprising a video system as part of the surroundings sensor system.

4. The system as recited in claim 2, further comprising a radar sensor as part of the surroundings sensor system.

5. The system as recited in claim 2, further comprising a navigation system as part of the surroundings sensor system.

6. The system as recited in claim 2, wherein the selecting is performed continuously over time, so that the output setpoint value changes over time, from moment to moment by the discrete ones of a plurality of instances of the minimum selection performed, respectively, at each of the moments, to be set to whichever of the plurality of setpoint values is the minimum at the respective current one of the moments based on respective second roadway curvatures depending on application of the focal point at the respective current one of the moments, and the processor is configured so that, after the second setpoint value drops over time to a minimum value determined at a particular point in time, the second setpoint value used as one of the plurality of setpoint values from the minimum is selected cannot increase again after the particular point in time until passage of the predefined time period from the particular point in time even when the second roadway curvature that the vehicle is predicted to negotiate, based on which the second setpoint value is determined, decreases.

7. The system as recited in claim 6, wherein a distance between the vehicle and the focal point at each of the moments is variable and the time period varies as a function of the distance.

8. The system as recited in claim 1, wherein, for each of the curvatures, the processor is configured to determine the respective setpoint values for the respective curvatures according to a maximum speed up to which a lateral acceleration of the vehicle remains below a limiting value.

9. The system as recited in claim 8, wherein the processor is configured to determine the limiting value for the lateral acceleration of the vehicle based on driving state variables.

10. The system as recited in claim 9, wherein the driving state variables include driving speed or a road condition.

11. The system as recited in claim 1, wherein the second roadway curvature is determined by obtaining the mean value of the plurality of local curvatures computed over the time period during which the focal point moves along the road.

12. A non-transitory computer-readable storage medium on which is stored program code for a control computer of a cruise control system of a motor vehicle, the control computer, when executing the program code, causing the control computer to perform a method, the method comprising:
  generating, an output setpoint value for a speed of the vehicle;
  performing, by an actuating device, an intervention into a drive and/or braking system of the vehicle by which to bring the speed of the vehicle to the generated output setpoint value;
  wherein:
    the generation of the output setpoint value for the speed is performed by:
      determining a plurality of setpoint values for the output setpoint value, the plurality of setpoint values including at least:
        a first setpoint value for the output setpoint value based on a first roadway curvature; wherein currently negotiated by the vehicle at a current position of the vehicle; and
        a second setpoint value for the output setpoint value based on a second roadway curvature that the vehicle is predicted to negotiate at a later point in time at a focal point that is at a distance from the current position; and
      selecting, as the selecting, as the output setpoint value, a minimum of the plurality of setpoint values; and
    the method further includes at least two modules including a base module configured to generate a base one of the following features (a)-(b):
      (a) the second roadway curvature is determined by obtaining a mean value of a plurality of local curvatures computed over a time period during which the focal point moves along a road; and
      (b) the selecting is performed continuously over time, so that the output setpoint value changes over time, from moment to moment by discrete ones of a plurality of instances of the minimum selection performed, respectively, at each of the moments, to be set to whichever of the plurality of setpoint values is the minimum at the respective current one of the moments based on respective second roadway curvatures depending on application of the focal point at the respective current one of the moments, and the selection is performed so that, after the second setpoint value drops over time to a minimum value determined at a particular point in time, the second setpoint value used as one of the plurality of setpoint values from which the minimum is selected cannot increase again after the particular point in time until passage of a predefined time period from the particular point in time even when the second roadway curvature that the vehicle is predicted to negotiate, based on which the second setpoint value is determined, decreases.

\* \* \* \* \*